US007297082B2

(12) United States Patent
Rice et al.

(10) Patent No.: US 7,297,082 B2
(45) Date of Patent: Nov. 20, 2007

(54) FLEXIBLE DRIVE MEMBER ATTACHMENT

(75) Inventors: John R. Rice, Chesterfield, MI (US); Michael A. Ciavaglia, Dearborn, MI (US); Joseph M. Johnson, Huntington Woods, MI (US)

(73) Assignee: Delphi Technologies, Inc., Troy, MI (US)

( * ) Notice: Subject to any disclaimer, the term of this patent is extended or adjusted under 35 U.S.C. 154(b) by 711 days.

(21) Appl. No.: 10/784,333

(22) Filed: Feb. 23, 2004

(65) Prior Publication Data

US 2005/0100398 A1 May 12, 2005

Related U.S. Application Data

(60) Provisional application No. 60/519,021, filed on Nov. 10, 2003.

(51) Int. Cl.
*F16G 13/02* (2006.01)

(52) U.S. Cl. ...................................................... 474/206

(58) Field of Classification Search ................ 474/202, 474/206, 237; 59/93; 70/236; 198/728, 198/731, 733; 296/146, 56, 146.4, 146.8, 296/170; 49/360, 345, 334; 403/339, 340, 403/385, 388

See application file for complete search history.

(56) References Cited

U.S. PATENT DOCUMENTS 4,019,354 A * 4/1977 O'Dell ........................ 70/236
4,174,865 A * 11/1979 Doveinis ................. 296/146.2
4,222,588 A * 9/1980 Suzuki et al. ............... 280/804
4,320,620 A * 3/1982 Rieger et al. .................. 59/93
4,480,743 A * 11/1984 Dehne ........................ 198/845
4,524,591 A * 6/1985 Lanka ......................... 70/236
4,526,251 A * 7/1985 Johannson .................. 187/229
4,790,425 A * 12/1988 Braun et al. ................ 198/731
4,938,651 A * 7/1990 Gilmor et al. .............. 414/694
5,216,780 A * 6/1993 Lutzke et al. ................. 16/421
6,283,535 B1 * 9/2001 Yuge ....................... 296/146.8
6,367,864 B2 * 4/2002 Rogers et al. ........... 296/146.4
6,405,486 B1 * 6/2002 Rogers et al. ................ 49/339
6,453,614 B1 * 9/2002 Rogers et al. ................ 49/340
7,021,003 B2 * 4/2006 Daniels et al. ................ 49/340

* cited by examiner

*Primary Examiner*—Vicky A. Johnson
(74) *Attorney, Agent, or Firm*—Doug D. Fekete

(57) ABSTRACT

A flexible drive member attachment is connected to a flexible drive member by a yoke having side walls connected by a bridge wall that has a stud connecting the attachment to a driven member. A coupler is disposed between the side walls and attached to the bridge wall. The coupler has teeth that extend through respective windows of the flexible drive member. An outer shoe engages each side wall of the yoke. Each outer shoe has a forward flange engaging the bridge wall and a rearward flange that extends through a rearward slot of the associated side wall. Each rearward flange has fingers that extend behind the flexible drive member and through spaces between adjacent teeth of the coupler and into sockets of the other shoe. The flexible drive member may be a drive chain or a drive belt having spaced windows.

14 Claims, 3 Drawing Sheets

FLEXIBLE DRIVE MEMBER ATTACHMENT

RELATED APPLICATION

Benefit of provisional patent application No. 60/519,021 filed Nov. 10, 2003 is claimed.

FIELD OF INVENTION

This invention relates to a flexible drive member attachment for connecting a flexible drive member to a driven member.

BACKGROUND OF THE INVENTION

A flexible drive member, such as a drive chain or a drive tape, is often used to transmit motion in a power operating system. See for instance, U.S. Pat. No. 6,367,864 granted to Lloyd Walker Rogers, Jr. et al. Apr. 9, 2002 which discloses a vehicle having a power operated lift gate that is opened and closed by a power operating system. The Rogers et al. system has two identical drive units each of which use a drive chain or a drive tape that is connected to a driven rod by a follower.

The use of drive chains or drive tapes in a power operating system of any type raises a need for an attachment for connecting the flexible drive member to a driven member that is pulled by the flexible drive member. Flexible drive members are often endless so that the attachment is preferably capable of being attached to an endless flexible drive member anywhere along its length.

SUMMARY OF THE INVENTION

The invention provides a flexible drive member attachment for connecting a flexible drive member having a plurality of spaced windows to a driven member that is compact and economical.

The flexible drive member attachment comprises a yoke having laterally spaced side walls connected by a bridge wall, a connector attached to the bridge wall, and a coupler disposed between the side walls and attached to the yoke. The coupler has a plurality of spaced teeth extending in a direction away from the bridge wall, and an outer shoe engaging each side wall of the yoke. Each shoe has a forward flange that engages the bridge wall and a rearward flange that engages a rearward edge of the associated side wall. Each rearward flange has at least one finger that extends from the rearward flange through a space between adjacent ones of the spaced teeth of the coupler and into a recess of the other shoe.

Each outer shoe preferably has longitudinally spaced, forward, resilient bows and longitudinally spaced resilient side bows to facilitate sliding of the attachment in a channel.

Each outer shoe preferably has a recess receiving the associated side wall and each side wall preferably has rearward feet that extend outwardly and that are separated by a slot with the rearward flange of each outer shoe extending through the slot of the associated side wall.

The flexible drive member attachment is preferably used in connection with a drive chain but can be adapted for attachment to other flexible drive members such as a flexible drive belt having spaced windows.

DETAILED DESCRIPTION OF A PREFERRED EMBODIMENT

Figure 1:
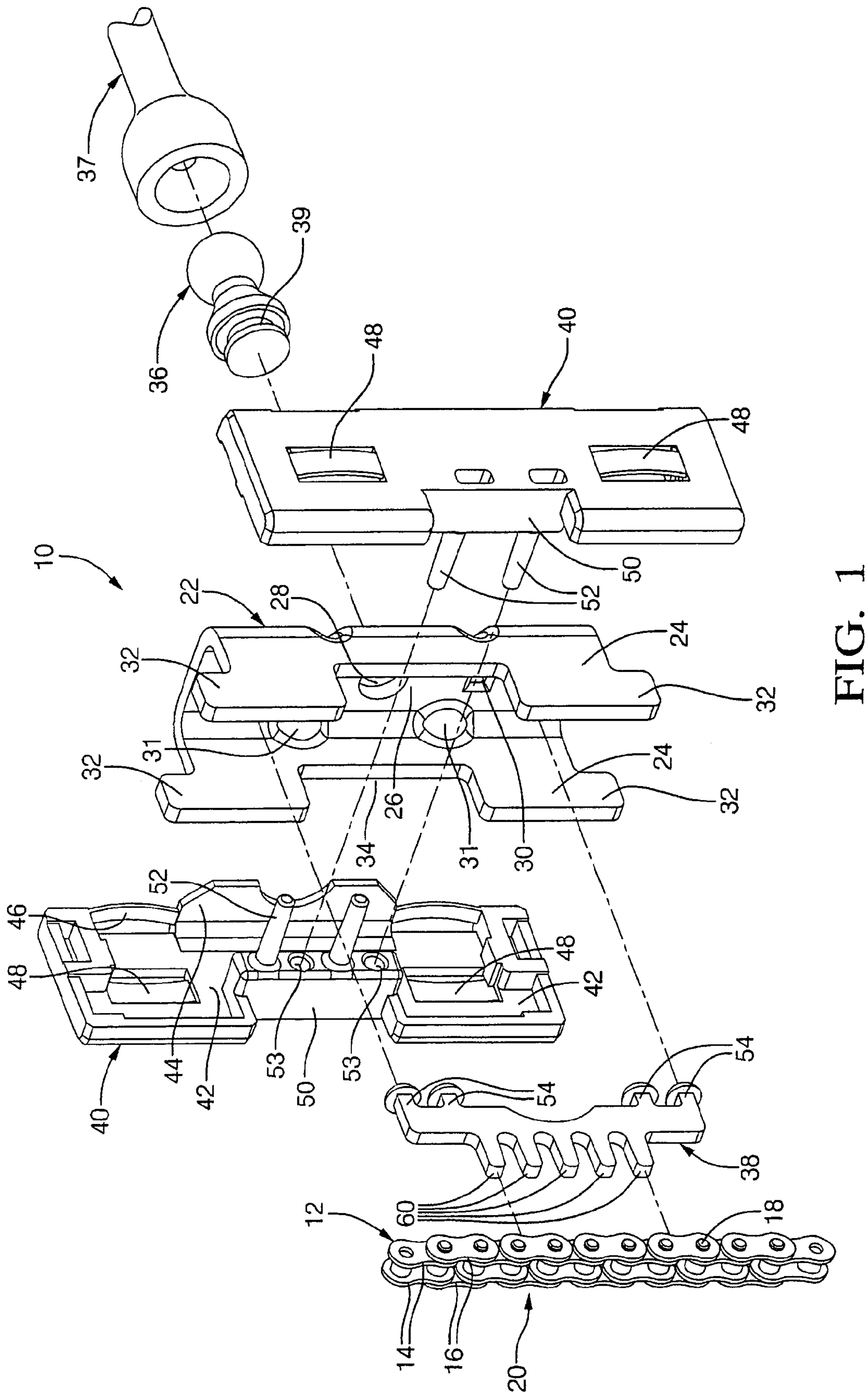
FIG. 1 is an exploded perspective view of a flexible drive member attachment in accordance with the invention in combination with a drive chain.
Figure 2:
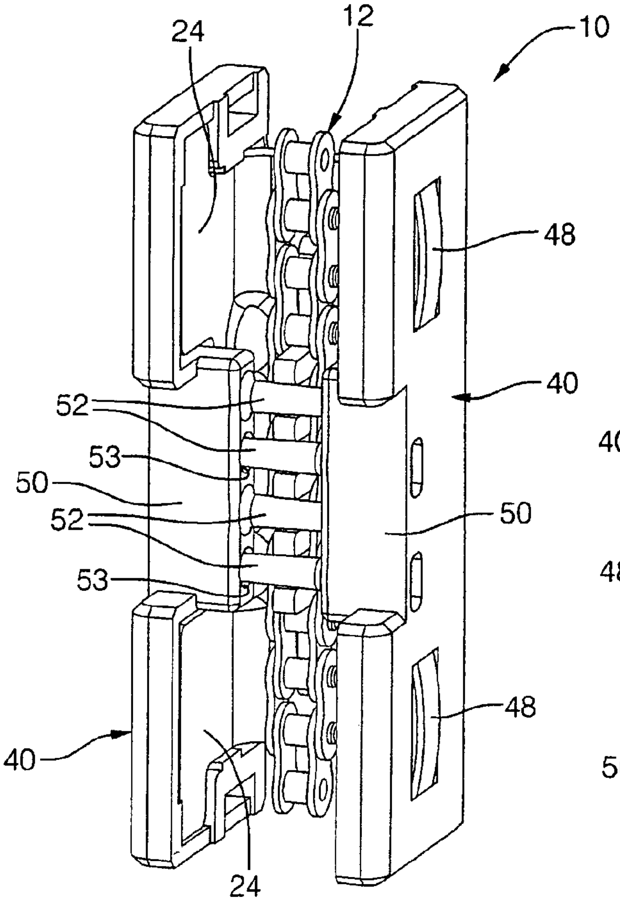
FIG. 2 is a perspective rear view of the flexible drive member attachment of FIG. 1.
Figure 3:
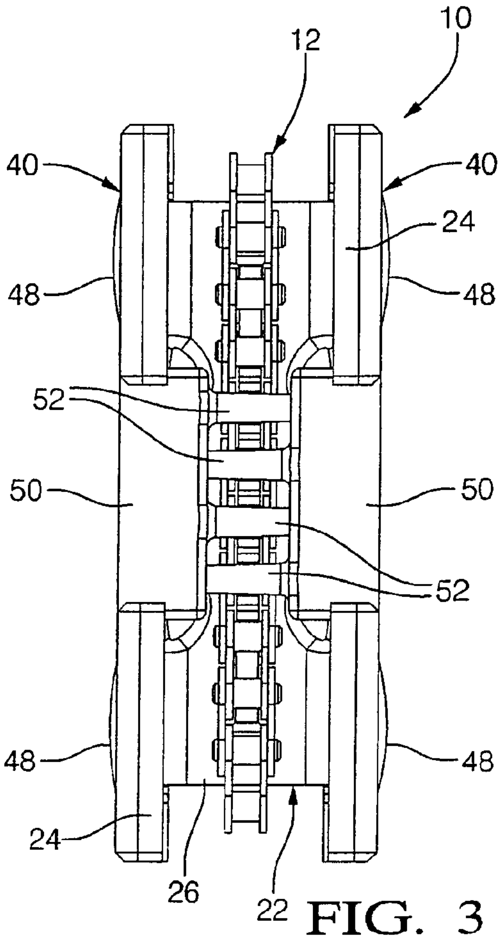
FIG. 3 is a rear view of the flexible drive member attachment of FIG. 1.
Figure 4:
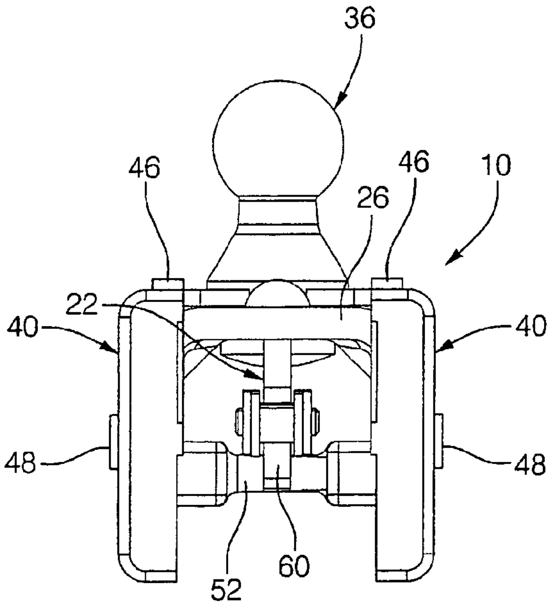
FIG. 4 is a top view of the flexible drive member attachment of FIG. 1.
Figure 5:
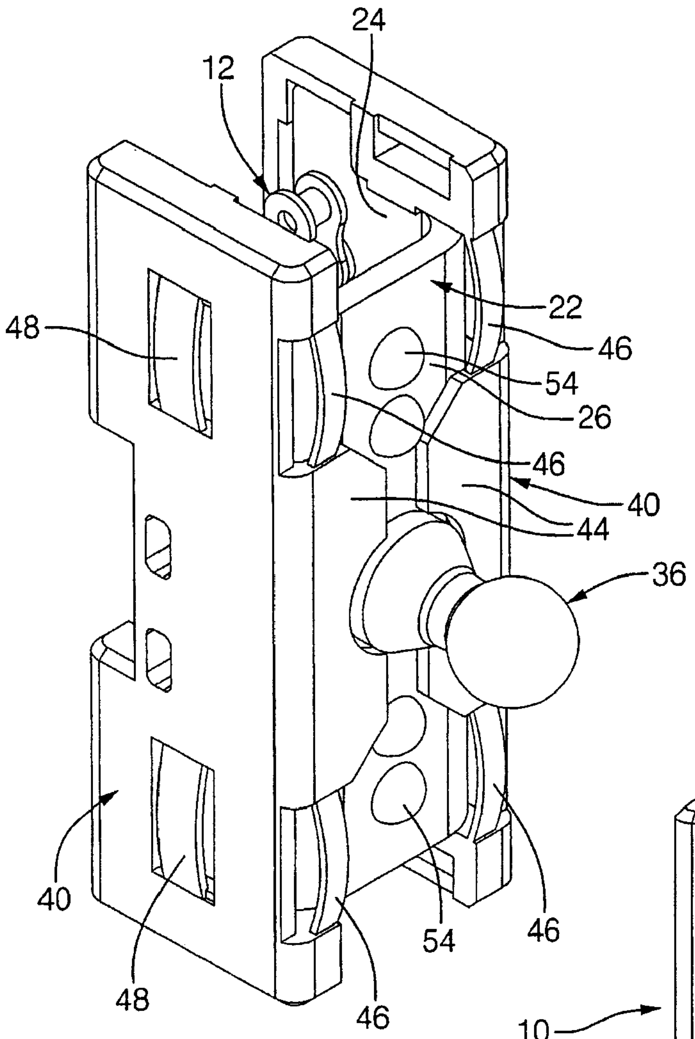
FIG. 5 is a perspective front view of the flexible drive member attachment of FIG. 1.

Referring now to the drawing, a flexible drive member attachment 10 of the invention is illustrated in connection with a flexible drive member having a plurality of evenly spaced windows, such as, a metal drive chain 12. Chain 12 comprises inner and outer pairs of metal links 14 and 16 that are connected end-to end by pivot pins 18 forming a plurality of evenly spaced windows 20.

Flexible drive member attachment 10 comprises a yoke 22 that has laterally spaced side walls 24 connected by a bridge wall 26 at one end. Bridge wall 26 has a round central hole 28 and a plurality of smaller square holes 30 on either side of the round central hole 28. Side walls 24 each have inwardly extending, part spherical dimples 31 near the bridge wall 26 to increase the strength and rigidity of yoke 22. Each side wall 24 also has upper and lower feet 32 that extend outwardly and that are separated by a central slot 34 at the rearward end of yoke 22. Yoke 22 is preferably of stamped sheet metal construction for economy of manufacture.

Flexible drive member attachment 10 includes a metal ball stud 36 for connecting flexible drive member attachment 10 to a driven member, such as socket ended rod 37, and a metal coupler 38 for connecting the flexible drive member attachment 10 to the drive chain 12. Ball stud 36 is suitably attached to bridge wall 26, for example by sticking stud end 39 in hole 28 and spin riveting ball stud 36 to bridge wall 26. Coupler 38 is also suitably attached to bridge wall 26, for example by riveting coupler 38 to bridge wall 26 as explained below. Coupler 38 is preferably of stamped sheet metal construction for economy manufacture.

While yoke 22, ball stud 36 and coupler 38 are preferably three separate metal pieces, these elements can be combined into one or two pieces. Moreover for some applications the yoke 22, ball stud 36 and coupler 38 can be of molded plastic construction.

Flexible drive member attachment 10 also includes two shoes 40 which are preferably of molded plastic construction for economy of manufacture. Each shoe 40 has a side wall recess 42 shaped to receive an associated side wall 24 of yoke 22 and a forward central flange 44 that engages bridge wall 26 around ball stud 36. Each shoe 40 has flexible, forward bows 46 on either side of the forward flange 44. Each shoe 40 also has flexible side bows 48 on either side of a rearward flange 50. Each rearward flange 50 has two tapered fingers 52 that extend toward the other flange with their tips disposed in sockets 53 of the other flange. Shoes 40 are attached to yoke 22 by attaching shoes 40 to each other by interconnecting fingers 52 and sockets 53 so that shoes 40 lie against the respective side walls 24 of yoke 22 with their rearward flanges 50 extending through respective slots 34.

Coupler 38 is disposed between the side walls 24 of yoke 22. Coupler 38 has a plurality of square studs 54 extending forward and through the square holes 30 with their protruding heads headed over to rivet coupler 38 to bridge wall 26. Coupler 38 also has a plurality of evenly spaced teeth 60 extending rearward and through respective ones of the windows 20 of drive chain 12. Drive chain 12 is trapped in yoke 22 by the tapered fingers 52 of shoes 40 which extend through respective spaces between adjacent teeth 60 of coupler 38 behind drive chain 12 and into associated sockets 53 of the other shoe. Thus attachment 10 is drivingly attached to drive chain 12 very securely. Shoes 40 house yoke 22 and are preferably equipped with the laterally spaced, resilient, forward bows 46 and the laterally spaced, resilient, side bows 48 so that the attachment 10 can slide easily and without rattling inside a channel such as the channel 24 shown in U.S. Pat. No. 6,367,864 discussed above.

Figure 6:
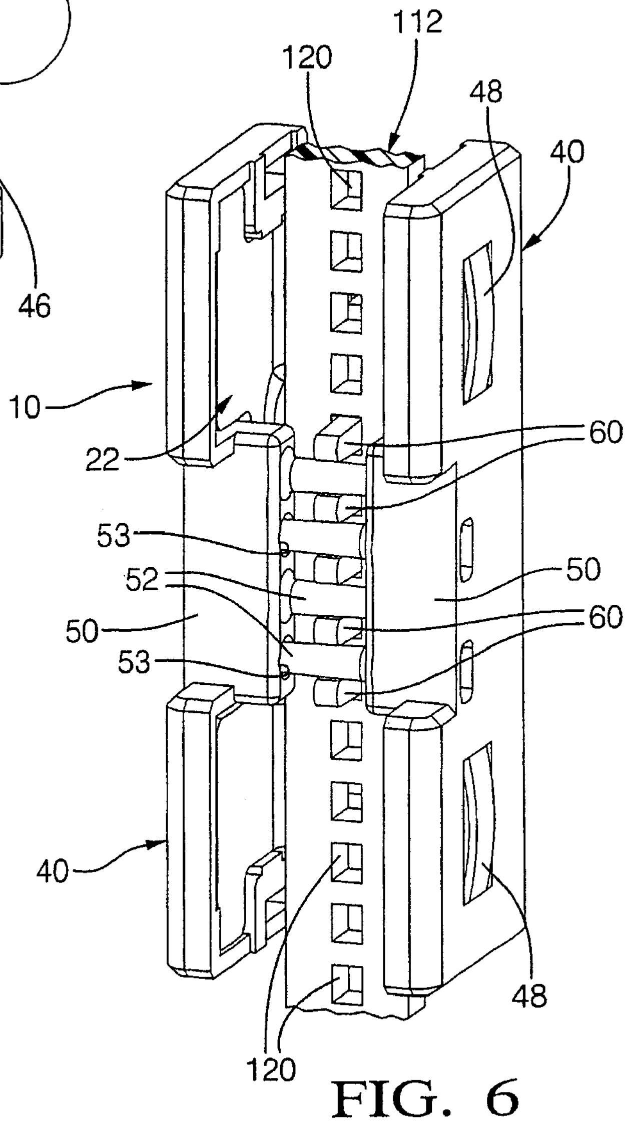
FIG. 6 is a perspective rear view of the flexible drive member attachment of FIG. 1 in combination with a drive tape having spaced windows.

In FIGS. 1-5, the flexible drive member attachment 10 has been illustrated in combination with a length of flexible drive chain of the metal link type. However, the flexible drive member attachment 10 can be used in conjunction with an endless flexible drive chain having its own master link or one which uses the flexible drive member attachment 10 as the master link. Moreover, the flexible drive member attachment can be used in conjunction with other types of flexible drive members, such as the flexible drive belt 112 having regularly spaced windows 120 that is shown in FIG. 6 and in FIG. 6 of U.S. Pat. No. 6,367,864 discussed above.

The flexible drive member attachment 10 of the invention may be used on power operated liftgates or sliding doors of automobiles or minivans as indicated by U.S. Pat. No. 6,387,864. However, the flexible drive member attachment 10 has many other uses-virtually any application or operating system involving a flexible drive member having spaced windows. In other words, it will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A flexible drive member attachment for connecting a flexible drive member having a plurality of spaced windows to a driven member, the flexible drive member attachment comprising:

a yoke having laterally spaced side walls connected by a bridge wall, the yoke having a connector attached to the bridge wall, a coupler disposed between the side walls and attached to the yoke, the coupler having a plurality of spaced teeth extending in a direction away from the bridge wall, and an outer shoe adjacent each side wall, each outer shoe having a forward flange that engages the bridge wall and a rearward flange that engages a rearward edge of the associated side wall and that has at least one finger that extends from the rearward flange and into a socket of the other shoe to attach the shoes to each other and the yoke.

2. The flexible drive member attachment as defined in claim 1 wherein the at least one finger of each rearward flange extends through a space between adjacent ones of the spaced teeth of the coupler.

3. The flexible drive attachment as defined in claim 1 wherein each outer shoe has longitudinally spaced, resilient, forward bows and longitudinally spaced, resilient side bows.

4. The flexible drive member attachment as defined in claim 1 wherein each outer shoe has a recess receiving the associated side wall.

5. The flexible drive member attachment as defined in claim 1 wherein each side wall has rearward feet that extend outwardly and that are separated by a slot and wherein the rearward flange of each outer shoe extends through the slot of the associated side wall.

6. The flexible drive member attachment of claim 1 wherein the flexible drive member attachment is adapted for connection to a drive chain.

7. The flexible drive member attachment of claim 1 wherein the flexible drive member is adapted for attachment to a flexible drive belt having spaced windows.

8. A flexible drive member attachment for connecting a flexible drive member having a plurality of spaced windows to a driven member, the flexible drive member attachment comprising:

a yoke having laterally spaced side walls connected by a bridge wall, a connector attached to the bridge wall, a coupler disposed between the side walls and attached to the yoke, the coupler having a plurality of spaced teeth extending in a direction away from the bridge wall, an outer shoe adjacent each side wall, each outer shoe having a forward flange that engages the bridge wall and a rearward flange that engages a rearward edge of the associated side wall and that has at least one finger that extends from the rearward flange through a space between adjacent ones of the spaced teeth of the coupler and into a socket of the other shoe, each outer shoe having longitudinally spaced forward resilient bows and longitudinally spaced resilient bows, each side wall having a rearward slot, and the rearward flange of each outer shoe extending through the rearward slot of the associated side wall.

9. The flexible drive member attachment as defined in claim 8 wherein each side wall has rearward feet that extend outwardly and that are separated by one of the rearward slots and wherein each outer shoe has a recess receiving the associated side wall.

10. The flexible drive member attachment as defined in claim 8 wherein each outer shoe having longitudinally spaced, resilient forward bows and longitudinally spaced resilient side bows.

11. The combination comprising a flexible drive member having a plurality of evenly spaced windows and a flexible drive member attachment comprising:

a yoke having laterally spaced side walls connected by a bridge wall, a stud connector attached to the bridge wall, a coupler disposed between the side walls, the coupler having a plurality of studs extending through holes in the bridge wall to connect the coupler to the yoke, the coupler having a plurality of evenly spaced teeth extending in a direction away from the bridge wall and through respective ones of the windows of the flexible drive member, an outer shoe adjacent each side wall, each outer shoe having a forward flange engaging the bridge wall, and a rearward flange that extends through a rearward slot of the associated side wall, and each rearward flange having at least one finger that extends from the rearward flange behind the flexible drive member and through a space between adjacent ones of the teeth of the coupler and into a socket of the other shoe.

12. The combination as defined in claim 11 wherein each shoe has longitudinally spaced, resilient forward bows and longitudinally spaced, resilient side bows.

13. The combination as defined in claim 11 wherein each side wall has rearward feet that extend outwardly and that are separated by one of the rearward slots and wherein each outer shoe has a recess receiving the associated side wall.

14. The combination as defined in claim 11 wherein the flexible drive member is a drive chain and each rearward flange has a plurality of fingers and associated sockets in the other rearward flange.

* * * * *